United States Patent [19]

Becker et al.

[11] Patent Number: 4,643,030

[45] Date of Patent: Feb. 17, 1987

[54] TORQUE MEASURING APPARATUS

[75] Inventors: Thomas P. Becker; Donald D. Grover, both of Kenosha, Wis.; Christopher B. Stout, Union Lake, Mich.; Glenn A. Kaufman; Gene E. Olson, both of Kenosha, Wis.

[73] Assignee: Snap-On Tools Corporation, Kenosha, Wis.

[21] Appl. No.: 693,256

[22] Filed: Jan. 22, 1985

[51] Int. Cl.[4] ........................ B25B 23/142; G01L 5/24

[52] U.S. Cl. .................................... 73/862.23; 73/770

[58] Field of Search ................ 73/770, 862.21, 862.23, 73/862.53

[56] References Cited

U.S. PATENT DOCUMENTS

| | | | |
|---|---|---|---|
| D. 244,829 | 6/1977 | Lehoczky et al. . | |
| 2,242,613 | 5/1941 | Mandl . | |
| 3,049,003 | 8/1962 | Felder . | |
| 3,472,102 | 10/1969 | Dunlap et al. . | |
| 3,523,471 | 8/1970 | Lance . | |
| 3,633,418 | 1/1972 | Larson | 73/862.21 |
| 3,649,826 | 3/1972 | Larsson et al. . | |
| 3,662,845 | 5/1972 | Pratt . | |
| 3,710,874 | 1/1973 | Seccombe et al. . | |
| 3,713,136 | 1/1973 | Nagy, Jr. . | |
| 3,812,923 | 5/1974 | Rock . | |
| 3,813,933 | 6/1974 | Weiss et al. . | |
| 3,828,255 | 8/1974 | Schuon . | |
| 3,895,517 | 7/1975 | Otto . | |
| 3,970,155 | 7/1976 | Otto . | |
| 3,975,954 | 8/1976 | Barnich . | |
| 3,995,477 | 12/1976 | Almond . | |
| 4,006,629 | 2/1977 | Barrett et al. . | |
| 4,026,369 | 5/1977 | Vliet . | |
| 4,073,187 | 2/1978 | Avdeef . | |
| 4,125,016 | 11/1978 | Lehoczky et al. . | |
| 4,176,436 | 12/1979 | McCombs et al. . | |
| 4,211,120 | 7/1980 | Tambini . | |
| 4,213,333 | 7/1980 | Krieger et al. . | |
| 4,244,213 | 1/1981 | Marcinkiewicz . | |
| 4,244,434 | 1/1981 | Wilson . | |
| 4,257,263 | 3/1981 | Herrgen . | |
| 4,307,608 | 12/1981 | Useldinger et al. | 73/862.53 X |
| 4,319,494 | 3/1982 | Marcinkiewicz . | |
| 4,397,196 | 8/1983 | Lemelson . | |
| 4,426,887 | 1/1984 | Reinholm et al. . | |
| 4,450,727 | 5/1984 | Reinholm et al. . | |

FOREIGN PATENT DOCUMENTS

| | | |
|---|---|---|
| 2651636 | 5/1978 | Fed. Rep. of Germany . |
| 818276 | 8/1959 | United Kingdom . |

*Primary Examiner*—Charles A. Ruehl
*Attorney, Agent, or Firm*—Emrich & Dithmar

[57] ABSTRACT

A torque wrench having a torque plug integral with the back side of the torque wrench handle and with strain sensing elements mounted on the torque plug and connected to signal processing circuits supported by the handle which control a digital display unit mounted on the handle. The processing circuits include a peak hold detector enabling display of the peak torque value during a torquing operation, and a peak hold response delay insuring capture of the peak torque value.

16 Claims, 5 Drawing Figures

TORQUE MEASURING APPARATUS

BACKGROUND OF THE INVENTION

This invention relates to torque measuring apparatus employing strain gauge sensors for providing an output indicative of torque measured, and in particular, to electronic circuitry for processing the output of the strain gauge sensor and providing a digital display of the torque measured.

Electronic torque wrenches providing digital display of torque measured have been available for many years. In many designs, the torque transducer is mounted on a beam that is parallel to the handle of the wrench. Typically, the torque transducer comprises a pair of resistive strain gauges, physically mounted on opposite sides of the bending beam and electrically connected in a balanced bridge circuit. The strain gauges measure bending strain in the bending beam as torque is applied, providing an unbalance signal which is processed and used to generate a digital representation of the torque applied. Although these prior art torque wrenches provide increased accuracy through the use of electronic means for sensing and displaying applied torque, a significant drawback of such torque wrenches is their sensitivity to hand hold position. That is, the accuracy of the indication of the torque applied is dependent upon the position of the hands of the user on the torque wrench.

To minimize this problem, electronic torque wrenches were proposed in which the strain sensing elements were removed from the wrench handle. For example, in U.S. Pat. No. 4,125,016, there is disclosed an electronic torque wrench in which applied torque is measured by a torsion stud which is removably inserted in a socket structure near the end of the wrench handle such that torque is applied to the fastener or other work piece directly through the torsion stud. The body of the torsion stud is instrumented with strain-sensitive resistors to produce an analog signal representing applied torque. Although this construction eliminates the hand hold problem, the introduction of the removable torsion stud creates other problems. For example, such arrangement does not present a rigid mechanical structure because the element is held in place only by a set screw. With continued use, the set screw could work loose, releasing the torsion stud from its mount, allowing it to drop out of the torque wrench head. Also, the sensors carried by the torsion stud are connected to the electronic circuitry through electrical leads which extend through passageways in the torque wrench handle and the mount for the torsion stud in the head portion of the wrench. It would appear that such electrical connection to the sensors, caused by the removable torsion stud, could easily be broken.

In processing the electrical output of strain gauge sensors in electronic torque wrenches or other torque measuring apparatus, it is becoming common practice to provide peak hold operation to detect and temporarily display the peak value of the highest torque reached during a torquing operation. Various arrangements have been proposed for providing peak hold operation, the simplest of which include a capacitor which is charged by the gauge signal, that is, the output of the strain gauge. The output of the peak hold detector is applied to the digital display of the torque measuring apparatus. When the torque decreases from its peak value, there is a corresponding decrease in the gauge signal. A unidirectional circuit element connected in the capacitor charging circuit becomes reverse biased when the gauge signal decreases, enabling the capacitor to temporarily hold its charge upon decrease of the gauge signal, so that the output of the peak hold circuit as applied to the display, causes the display to temporarily maintain an indication of the highest torque reached. In more sophisticated torque measuring systems, in which torque signals are processed by microprocessor, the torque values sensed are provided by a sensor temporarily stored in memory and the memory content is updated periodically under microprocessor control. Peak detection can be made by comparing successive values of torque sensed. Whether the torque signals are processed directly by analog to digital means or by microprocessor means, the conversion is necessarily done in some period of time. If there is a change in the torque during the update period, this can result in a large error due to the change in the torque signal input during the conversion cycle. The amount of error is dependent upon the duration of the update period, but can approximate ten to twelve percent for an update period in the order of 300 milliseconds.

SUMMARY OF THE INVENTION

It is an object of the invention to provide a torque wrench with electrical strain sensors and which includes an improved mounting arrangement for the strain sensors.

Another object of the invention is to provide a torque wrench in which the torque reading is not affected by the hand hold position of the user.

A further object of the invention is to provide a torque measuring apparatus providing a digital display of torque measured, and which insures capture and display of the peak value of torque measured during a torquing operation.

These and other objects are accomplished by the present invention which has provided a torque wrench comprising a torque lever, a torque stud, and strain responsive means, said torque lever including an elongated rigid arm member having a longitudinal axis, said torque stud having a drive axis extending perpendicular to the longitudinal axis of said arm member near one end thereof and having a first end fixed to said arm member near said one end and a second end adapted to engage a workpiece, and said strain responsive means being mounted on said torque stud between its first and second ends for producing a torque signal related to torque transmitted to the workpiece by said torque stud as said arm member is rotated about the drive axis of said torque stud.

Further in accordance with the invention, a torque wrench comprises a torque lever, a torque stud, strain responsive means, signal processing means, and digital display means, said torque lever including an elongated rigid arm member having a longitudinal axis, said torque stud having a drive axis extending perpendicular to the longitudinal axis of said arm member near one end thereof and having a first end fixed to said arm member near said one end and a second end adapted to engage a workpiece, said strain responsive means being mounted on said torque stud between its first and second ends for producing a time varying torque signal related to torque transmitted to the workpiece by said torque stud as said arm member is rotated about the drive axis of said torque stud, said signal processing means and said digital display means being supported on said arm member, said signal processing means including peak hold means and inhibit means, said peak hold means responsive to said time varying torque signal for generating a peak value signal corresponding to the instantaneous value of the torque signal as long as the torque signal is increasing in amplitude and for maintaining the peak value of the torque signal following a decrease in the torque signal from a peak value, said peak value signal being applied to said digital display means which responsively displays a numerical representation of torque measured, and said inhibit means being responsive to a decrease in the torque signal from a peak value for generating a control signal for application to said digital display means at a preselected time following the occurrence of the decrease in the torque signal to cause said digital display means to continue to display the peak value of torque measured after the occurrence of the decrease in the torque signal.

In accordance with another aspect of the invention, there is provided a torque measuring apparatus including sensor means for producing a time varying torque signal related to the instantaneous value of torque measured, and digital display means, and signal processing means responsive to said torque signal for causing the digital display means to display a numerical representation of torque measured, wherein said signal processing means comprises input means, signal following means, display control means including display driving means having a display input and a control input, said input means being coupled to said sensor means for receiving the torque signal, said signal following means being interposed between said input means, and said display driving means for applying the torque signal to said display input of said display driving means, said display driving means responding to the torque signal to cause the display means to display a numerical representation of the instantaneous value of the torque measured, and said signal following means including inhibit means responsive to a decrease in the torque signal from a peak value for generating a control signal for application to said control input of said display driving means at a preselected time following the occurrence of the decrease in the torque signal to inhibit said display driving means from further responding to the torque signal thereby causing the digital display means to display the peak value of torque measured after the occurrence of the decrease in the torque signal.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
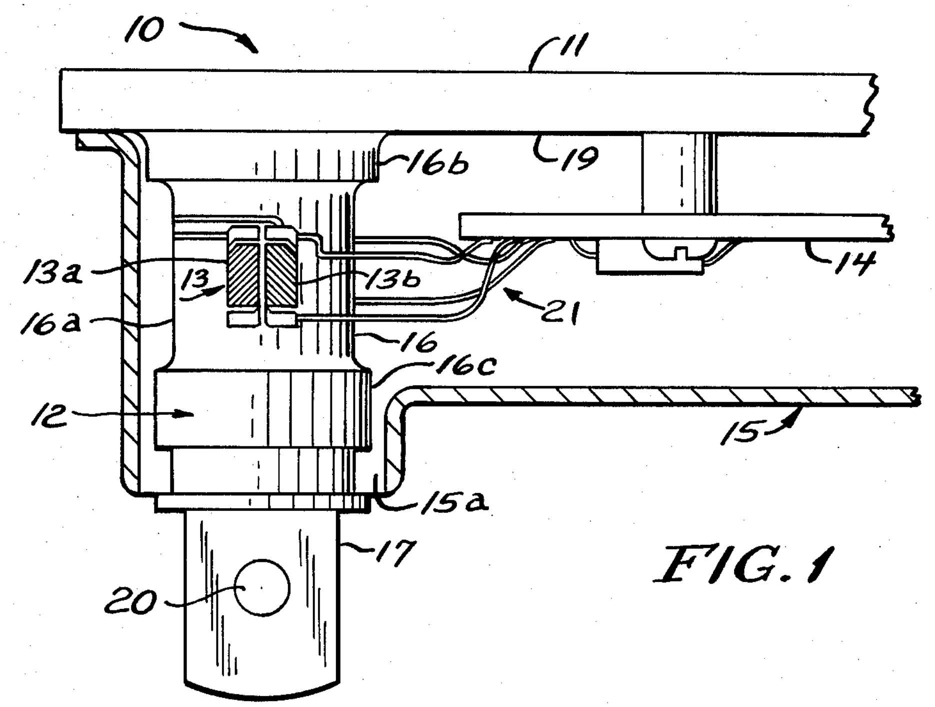
FIG. 1 is a fragmentary side elevation view of the head portion of a torque wrench, partially in section, illustrating the strain gauge mounting arrangement provided in accordance with the present invention.

Referring to FIG. 1, there is illustrated the head portion of working end of torque wrench 10 which includes a handle 11, a torque stud 12, a strain sensor 13, a printed circuit board 14 and a shroud 15.

The handle 11, which is of a rigid material, defines a torquing lever for the torque wrench for applying torque to a workpiece through the torque stud 12 mounted near the working end of the handle 11.

The torque stud 12 has a base portion 16 and a drive portion 17. The base portion 16 of the torque stud 12 is generally cylindrical in shape and typically has a neck portion **16*a* of reduced diameter between ends 16*b* and 16*c* of the base portion 16. The torque stud 12 is attached to the handle 11 by end 16*b* of its base portion 16 which is fixedly secured to the bottom surface 19 of the handle 11 as by welding. The torque stud 12 may alternatively be formed integrally with the handle 11. The drive axis of the torque stud 12 extends perpendicular to the longitudinal axis of the handle 11. The drive portion 17, which extends outwardly from end 16*c* of the base portion, has a square configuration and includes a spring loaded ball 20 mounted on one surface for securing the drive portion 17** in conventional socket wrench.

The strain sensor 13 includes a pair of resistive type strain sensing elements 13A and 13B shown mounted on opposite sides of the neck portion **16*a*. The four sensing elements are interconnected in a balanced bridge circuit, in a manner known in the art, the output of which is connected via four electrical conductors indicated at 21 to the signal processing circuits 25 (shown in block diagram in FIG. 2) of the torque wrench. The signal processing circuits which are mounted on the printed circuit board 14, process the torque or gauge signal and control a digital display (not shown) which is typically mounted on the upper surface of the torque wrench handle but which alternatively may be at a remote location. The base portion 16 of the torque stud 12 and the printed circuit board 14 are enclosed by the shroud 15 which has a forwardly defined opening 15*a* through which passes the drive portion 17 of the torque stud 12. The mounting of the strain sensor 13 on the torque plug 12 which in turn is fixedly attached to the bottom surface 19 of the torque wrench handle 11, provides structural protection for the torque wrench assembly. In addition, attaching the strain sensor to the torque plug 12** eliminates hand hold position problems associated with some prior art electronic torque wrenches.

Figure 2:
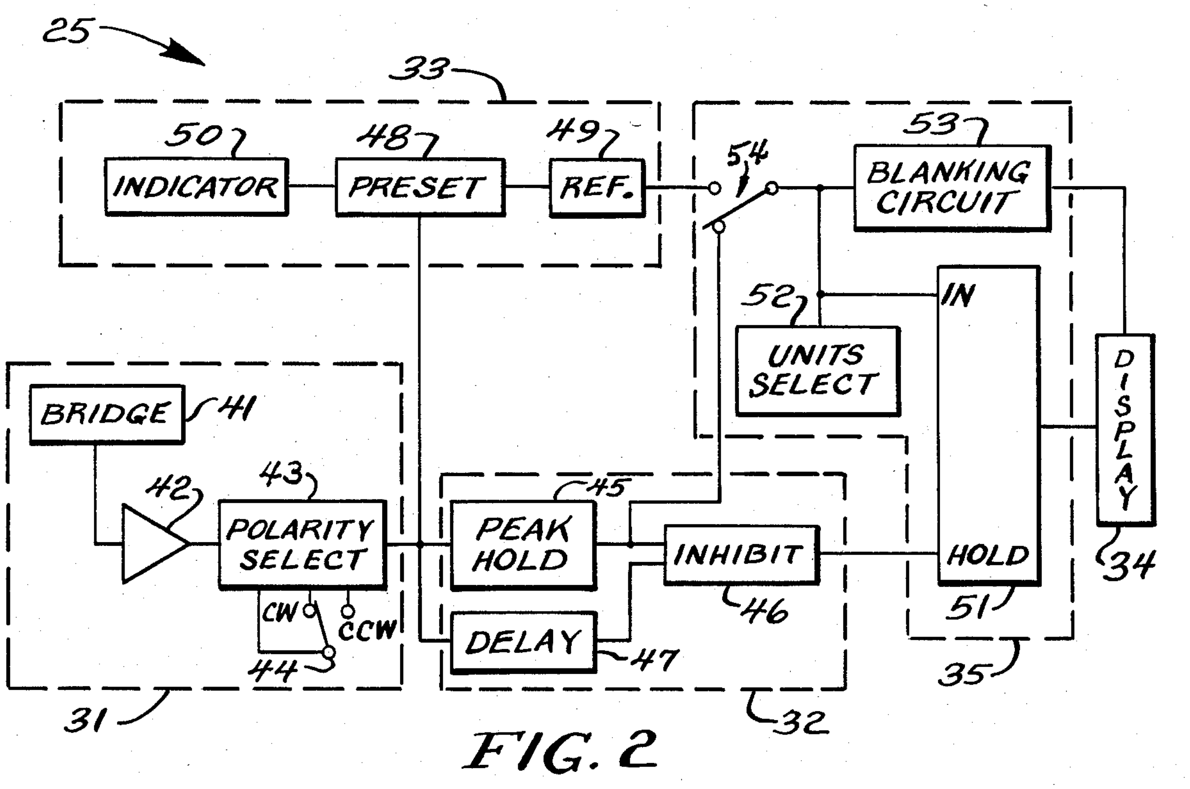
FIG. 2 is a block diagram of electronic signal processing circuits of the torque wrench of the present invention.

Referring to FIG. 2, the signal processing circuits 25 for the torque wrench include a sensor input circuit 31 a peak detecting circuit 32, a preset indicating circuit 33, a digital display unit 34 and a display control circuit 35. The signal processing circuits 25 are energized from a battery supply (not shown) typically housed within the shroud 15.

The sensor input circuit 31 includes a strain gauge bridge 41 formed by the resistive sensing elements 13A, 13B, etc. (FIG. 1), an amplifier 42 and a polarity select circuit 43 including polarity select switch 44.

The peak detecting circuit 32 includes a peak hold circuit 45, an inhibit circuit 46 and a delay circuit 47. The preset indicating circuit 33 includes a comparator circuit 48, a signal reference source 49, and an indicator 50. The display control circuits 35 include a display driver circuit 51, a scaling select circuit 52, a display blanking circuit 53, and display select switch 54.

The strain sensor 13 of the sensor input circuit 31 senses torque transmitted to a workpiece by the torque stud 12 as the torque wrench handle 11 is rotated about the drive axis of the torque stud 12 and generates a gauge signal at the output of the strain gauge bridge 41. The strain gauge bridge 41 provides an output of approximately 25 millivolts for a 200 lb.-foot applied torque. Amplifier 42 is a standard instrumentation amplifier which provides a gain of approximately forty to yield an output of one volt for a 200 lb.-foot applied torque. The amplifier circuit includes suitable controls accessable through shroud 15 as is known in the art to provide zero adjust, full scale output calibration, etc.

The amplified gauge signal provided at the output of amplifier 42 is passed through polarity select circuit 43 which enables use of the torque wrench in clockwise or counterclockwise directions through setting of switch 44 to the clockwise or the counterclockwise position, respectively. The switch 44 is accessible through an opening (not shown) in the shroud 15 for operation by the user. Polarity select circuit 43 comprises a signal inverter connectable into the gauge signal path by switch 44 to provide a positive polarity signal at the output of the polarity select circuit 43 for clockwise and counterclockwise use of the torque wrench. The amplified gauge signal is applied to the peak hold circuit 45, to the inhibit circuit 46 through delay circuit 47, and to preset comparator circuit 48.

The peak hold circuit 45 extends the amplified gauge signal provided by the output of the polarity select circuit 43. As long as the gauge signal is increasing, the peak hold circuit 45 follows the gauge signal and provides to the display driver circuit 51 a signal corresponding to the current value of the gauge signal. The signal output of peak hold circuit 45 is extended through display select switch 54 to a display input of the display driver circuit 51 which cause the digital display unit 34 to display the value of the torque sensed. The display driver circuit 51 updates the reading at a periodic rate, on the order of ⅓ seconds. The display select switch 54 is accessed through an opening (not shown) in the shroud 15.

Whenever the gauge signal begins to decrease from a peak value, the peak hold circuit 45 "holds" that peak value and extends the peak value signal to the display driver circuit 51. The inhibit circuit 46 responds to peak value output of the peak hold circuit 45 and to a decrease in the gauge signal provided by the polarity select circuit 43 to apply an inhibit signal to a control input of the display driver circuit 51 when the input gauge signal decreases from the peak value held by the peak hold circuit 45. The inhibit signal provided to the display driver circuit 51 causes the display driver circuit 51 to maintain the display of the peak value for a given time. The delay circuit 47 delays response of the inhibit circuit 46 to a decrease in the gauge signal. The delay time established by the delay circuit 47 is greater than the length of the display update cycle to insure capture of the peak value of torque measured.

Digressing, as has been indicated, the state-of-the-art means of display of torque readings is digital. Whether torque signals are processed directly by analog to digital means or by microprocessor means, the conversion is necessarily done in some period of time, referred to as the display update period.

Figure 3:
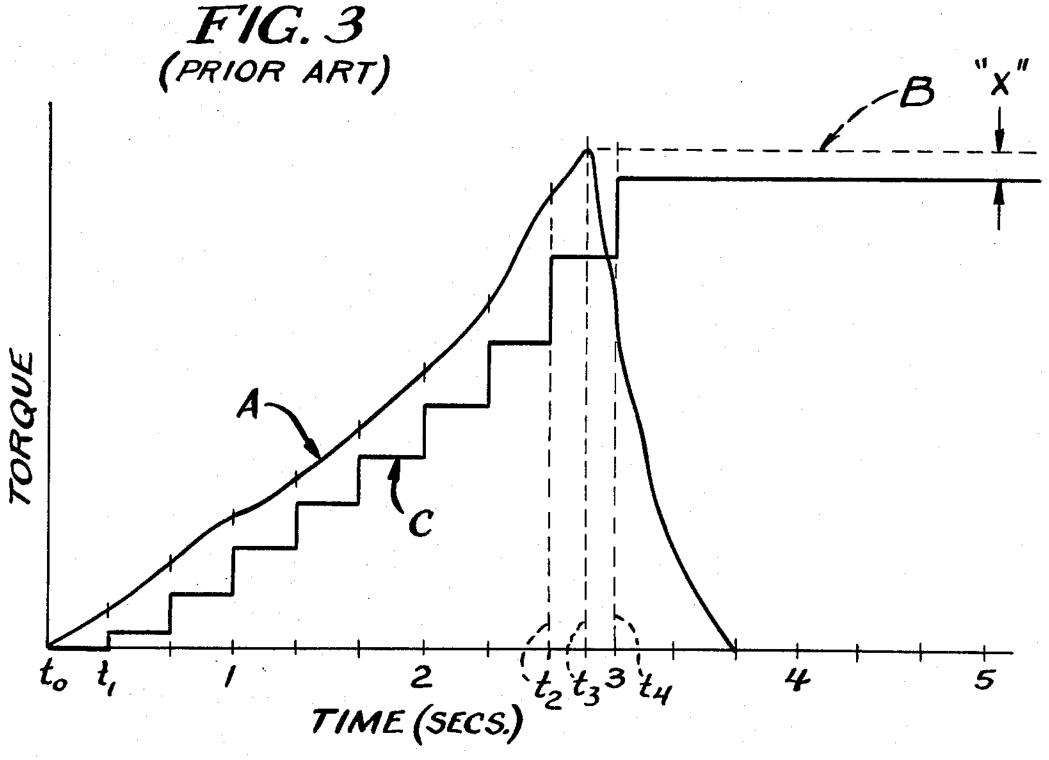
FIG. 3 (PRIOR ART)
FIG. 3 is a graph illustrating actual and displayed torque for a prior art electronic torque wrench.

Referring to FIG. 3, which graphically depicts the performance of a prior art electronic torque wrench having a peak hold circuit without delay, curve A represents the actual torque applied to a bolt or the like. At time $t_0$, torque is applied and is increased steadily to time $t_3$ when no more torque is applied or the bolt breaks away, whereupon the actual torque decreases rapidly.

The output of the peak hold circuit is represented by the waveform A from $t_0$ to $t_3$, but is represented by the dotted line B from $t_3$ on. The peak hold circuit produces an output equal to the actual peak torque from that point on.

The displayed torque value is periodically updated so that the displayed torque is represented by a staircase wave C. The display associated with such prior art torque wrench is assumed to be updated every ⅓ second, by counting the number of oscillator pulses generated during the previous time interval. Thus, during the first ⅓ second in FIG. 3, that is, between $t_0$ and $t_1$, the displayed torque is zero. At time $t_1$, the displayed torque increases to a value between the actual torques at $t_0$ and $t_1$. The exact value can be calculated, but the method of calculation is not important here. Thus, the displayed torque does not really represent the actual instantaneous torque at the time it appears on the display but that is not significant because it is increasing and the user is not really concerned with the instantaneous torque.

The displayed value during each succeeding interval corresponds to a value between the actual torques during each preceeding interval. Note that the peak torque is reached at time $t_3$ which would invariably occur during an update interval. At $t_3$, the displayed torque will be represented by that between $t_2$ and the prior update time. At time $t_4$, the displayed torque rises to a level, in the manner previously described, between the levels at times $t_2$ and $t_4$. As a result, the displayed torque is less than the actual peak torque by an amount "X", which amount represents an error. Whereas the user thinks that he is viewing the peak torque, it is actually in error by the amount "X".

Figure 4:
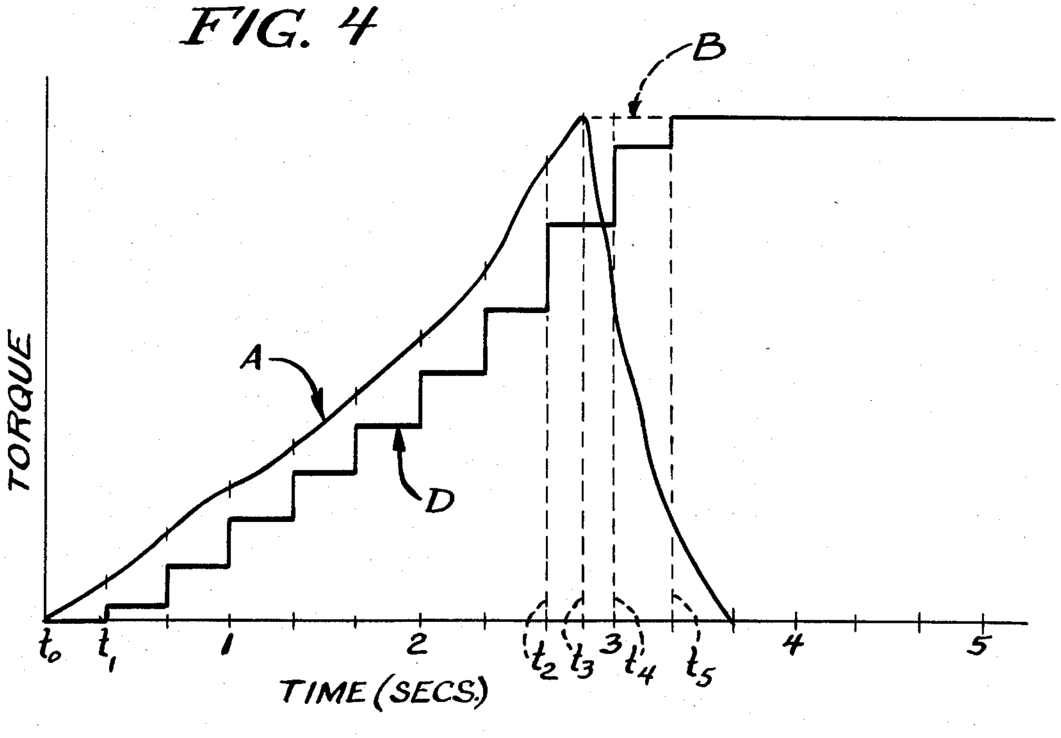
FIG. 4 is a graph illustrating actual and displayed torque for the electronic wrench of FIGS. 1 and 2.

FIG. 4 graphically illustrates the performance of the circuit in FIG. 2. The waveform A still represents the actual torque, which increases during the period $t_0$ to $t_3$ at which time it begins decreasing rapidly because no further torque has been applied or the bolt has been broken loose as explained above. The output of the peak hold circuit from $t_0$ to $t_3$ is still represented by the same waveform A between those points and by the dotted line B thereafter. The displayed torque is a staircase wave D which is identical to the staircase wave B in FIG. 3 to the time $t_4$. The value at $t_4$ is maintained until $t_5$, the next update time. Because of the delay furnished by the circuit of FIG. 2, the displayed torque represents the actual torque during the period $t_4$ to $t_5$, which is the peak torque. Accordingly, the displayed torque from $t_5$ on is actually the peak torque value and there is no error "X".

Referring to FIG. 2, the preset indicating circuit 33 compares the gauge signal provided at the output of the polarity select circuit 43 with a preset value established by reference source 49. When the gauge signal exceeds the preset value, indicator 50 is activated. The indicator 50 may be an oscillator which provides an audio output or may be a lamp or other indicating device. The display select switch 54 is operable to connect the reference source 49 to the display input of the display driver circuit 51 enabling display by display unit 34 of the reference or preset value established by the reference source 49.

In the display control circuit 35, the scaling select circuit 52 controls the display driver circuit 51 such that the torque signal is displayed in a given unit of measurement. For example, the display driver circuit 51 can be controlled to normally display measured torque in units of pound-foot or can be adjusted by way of the scaling select circuit 52 to display the reading directly in units of Newton-meter.

The display blanking circuit compares the torque signal with a preset value, selected, for example, to correspond to 10 percent of the maximum torque signal expected, to blank the display for underrange torque values.

The display blanking circuit 53 responds to the output of the peak detecting circuit 32 to disconnect the power source from the display unit 34 whenever the torque measured is less than the preselected value. De-energizing the display unit 34 at lower torque values prevents the operator from using the torque wrench on too small of a fastener where the accuracy of the reading would be poor. In addition, because of the high gain employed in the processing circuits, a low reading is almost impossible to maintain and a fluctuating zero is an operator nuisance. Moreover, battery life is greatly extended by blanking the display unit 34 for underrange values.

With reference to FIG. 2, in use, the display select switch 54 is set to connect the output of the peak detecting circuit 32 to the display input of the display driver 51. The polarity select switch 44 is set by the user to the clockwise or counterclockwise position depending upon the direction in which the torque wrench 10 is to be used.

During a torquing operation, the gauge signal generated by the strain gauge sensors 13 which comprise strain gauge bridge 41 is amplified by amplifier 42 and passed through polarity select circuit 43 to the input of the peak hold circuit 45. The peak hold circuit 45 follows the gauge signal which is extended from the peak hold circuit 45 through switch 54 to the display input of the display driver circuit 51 which controls the digital display unit 34 to display the current value of the torque signal. The blanking circuit 53 responds to the torque signal to blank the display until the torque signal exceeds the preselected value. As long as the gauge signal is increasing, the inhibit circuit 46 is ineffective and the display driver follows the gauge signal causing the display of the current value of the torque measured.

When the torque applied decreases or is released at the end of the torquing operation, the torque signal provided by the strain gauge bridge 41 begins to decrease. The inhibit circuit 46 responds to the torque signal decreasing relative to the peak hold signal and generates an inhibit signal which is applied to the control input of the display driver circuit 51, causing the display driver circuit 51 to hold the current value provided at the output of the peak hold circuit 45. The delay circuit 47 delays the response of the inhibit circuit 46 to the change in torque signal to insure that the peak torque reading is captured.

If the torque signal reaches the preset value established by reference source 49, the preset comparator circuit 48 activates the indicator 50 to alert the user to the fact that the gauge signal has reached the level of the preset signal. If desired, the user may operate the torque wrench in the preset mode, selecting the value of torque to be applied to workpiece, and adjusting the reference source 49 to this value while displaying the preset value on the display unit. In this operating mode, the user increases torque applied to the workpiece until the indicator 50 is activated.

Figure 5:
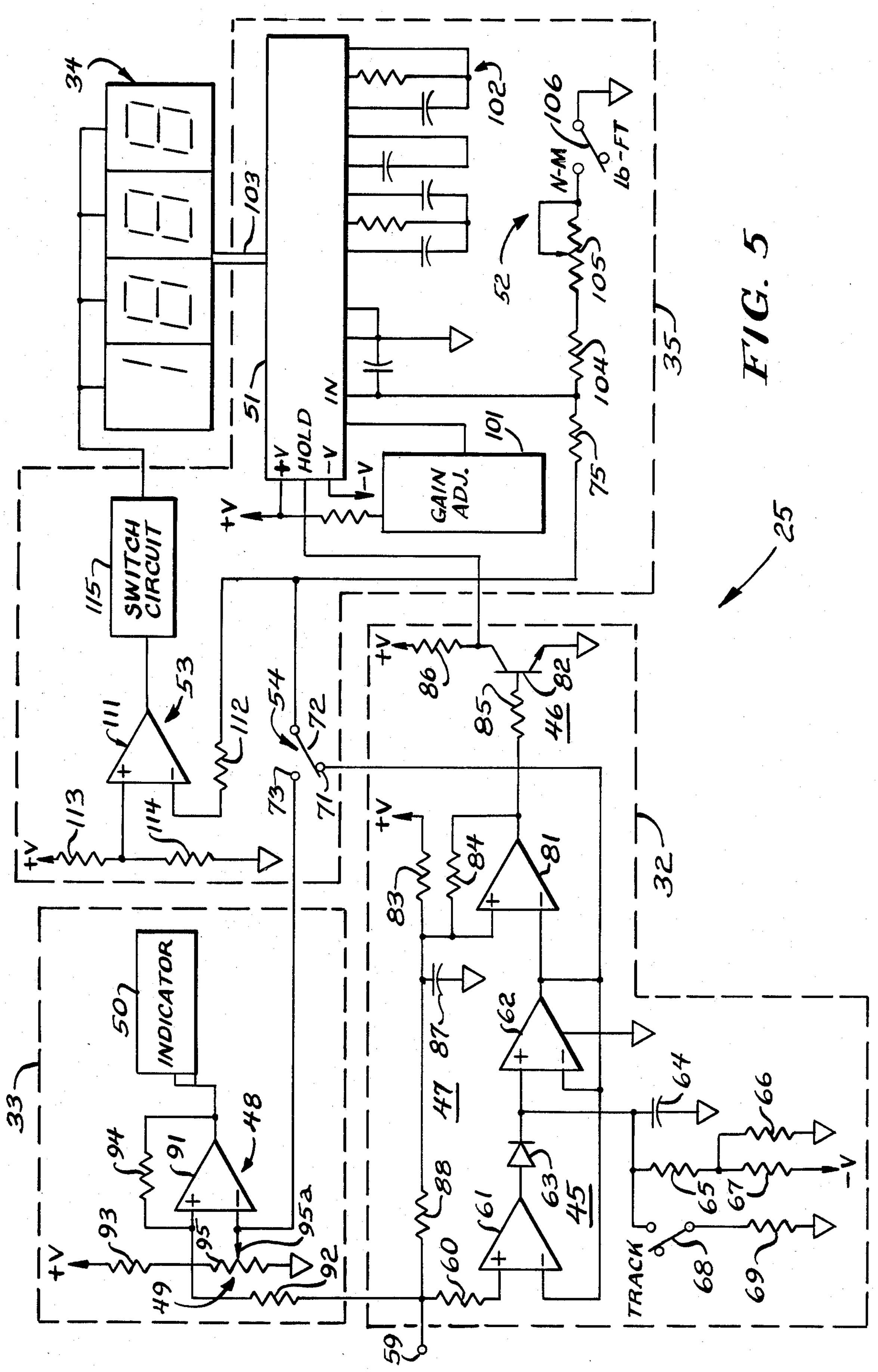
FIG. 5 is a schematic circuit and partial block diagram of the signal processing circuits of the torque wrench of the present invention.

Considering the signal processing circuits 25 in more detail, with reference to FIG. 5, the sensor input circuit 31 is conventional and thus is not shown in detail. Peak hold circuit 45 comprises a pair of operational amplifiers 61 and 62, a signal storage circuit including diode 63 and capacitor 64, and a reset network including resistors 65–67, a switch 68 and a further resistor 69. The sensor input signal is supplied over input terminal 59 which is connected through resistor 60 to the noninverting input of amplifier 61 which is connected for operation as a voltage follower. Amplifier 61 has its output connected through diode 63 and capacitor 64 to ground, which defines a charging path for the capacitor 64. Series connected resistors 65 and 66, which are connected in parallel with the capacitor 64, define a high resistance discharge path for the capacitor 64. Switch 68 is operable to connect resistor 69 in parallel with capacitor 64 to provide a low resistance discharge path for capacitor 64. This mode enables the peak hold circuit to track the torque signal rather than provide peak hold operation. In the tracking mode, the discharge time of capacitor 64 via resistor 69 is about 1/10 second.

Amplifier 62, which is connected for operation as a voltage follower, has its noninverting input connected to the junction of diode 63 and capacitor 64 and its output connected to the inverting inputs of amplifiers 61 and 81. A level shifting bias is provided at the noninverting input of amplifier 62 by resistors 65 and 67.

Display switch 54 is a double pole, single throw switch having poles 71 and 73 and switch arm 72. The output of amplifier 62 is connected to the pole 71 of switch 54 which has its switch arm 72 connected through a resistor 75 to the display input of the display driver circuit 51.

The inhibit circuit 46 comprises an operational amplifier 81, a drive transistor 82, and resistors 83–86. Delay circuit 47 includes a capacitor 87 and a resistor 88.

Amplifier 81, which is connected for operation as a voltage comparator, has its inverting input connected to the output of amplifier 62 to receive the peak hold signal, and has its noninverting input connected through resistor 88 to the input terminal 59 to receive the gauge signal. The output of amplifier 81 is connected back to its noninverting input through resistor 84 which receives a DC bias level through resistor 83 from +V. The output of amplifier 81 is connected through current limiting resistor 85 to base of transistor 82 which has its collector connected through resistor 86 to +V and its emitter connected to reference potential. The collector of transistor 82 is also connected to the hold input of the display driver circuit 51.

Capacitor 87 is connected in a charging path between resistor 88 at the input terminal 59 and reference potential, the junction of resistor 88 and capacitor 87 being connected to the noninverting input of amplifier 81.

Referring to the preset indicating circuit 33, the preset comparator circuit 48 includes an operational amplifer 91 and fixed resistors 92–94. The reference source 49 comprises a potentiometer 95. Amplifier 91, which is connected for operation as a voltage comparator, has its noninverting input connected through resistor 92 to the circuit input terminal 59. Resistor 93 and potentiometer 95 are connected in series between +V and reference potential. The wiper 95*a* of the potentiometer is connected to the inverting input of the amplifier 91. The output of the amplifier 91 is connected through feedback resistor 94 to the noninverting input of the amplifier and to the indicating circuit 50. The wiper 95*a* of the potentiometer 95 is also connected to pole 73 of the display select switch 54 to enable the preset value to be extended to the display driver circuit 51.

The display driver circuit 51 is an analog-to-digital converter which functions to convert a DC level supplied to its display input to suitable control signals for the digital display unit 34. The analog-to-digital converter may be the type ICL 7117 commercially available from Intel. A gain adjust network 101 enables adjustment of the analog to digital converter to provide the desired output for a given input. External bias network 102 selects the timing rate for the internal oscillator of the unit. The display driver circuit 51 controls the operation of the LED display unit 34 by signals provided over a set of output lines 103. The digital display is a 3.5 digit LED display.

The basic function of the analog to digital converter is that of a voltmeter. As has been indicated, the gain of the amplifier 42 (FIG. 2) is set such that a one volt input signal causes a display of 199.9. Thus, a 200 lb.-foot input amplified to 1 volt will be displayed as 200.0 lb.-foot. To facilitate other units of measure, such as Newton-meter, the gain of the A/D is adjusted by way of the scaling select circuit 52 which comprises a current sink formed by resistor 104, variable resistor 105 and switch 106 which is operable to connect the resistors 104–105 in series between the input of the display driver and reference potential and which together with resistor 75, define a voltage divider at the display input of the display driver circuit 51. When the scaling select switch 106 is in the open position illustrated, the torque value is displayed in units of lb.-foot. When the switch 106 is closed, torque value is displayed in units of Newton-meter.

The blanking circuit 53 includes amplifier 111, resistors 112–114 and switch circuit 115. Amplifier 111 has one input connected through resistor 112 to switch arm 72 of display select switch 54 and a second input connected to a 0.1 volt reference provided by resistors 113–114. Switch circuit 115 is connected to the output of the amplifier 111. Since the strain gauge output is linear, and since the A/D converter is set to provide a 1 volt output for 200 lb. then 0.1 volt reference corresponds to ten percent of expected full scale reading. For any amplified gauge signal or preset signal, as selected by switch 54, which is below 0.1 volt, the switch circuit 115 disconnects power from the display unit 34.

The power supply for the signal processing circuits is obtained from a series of five "C" type flashlight cells which make up a 7.5 volt battery. A 5 volt regulator provides power +V to all circuits including the gauge bridge from this 5 volt source, negative 5 volts −V is desired by a voltage converter (not shown) to provide the bi-polar operating characteristics of the input circuit and the A/D converter.

OPERATION

For purposes of illustration of the operation of the signal processing circuits, it is assumed that switches 54, 68 and 106 are set in the positions indicated in FIG. 5. During torquing operations, the display unit 34 is blanked by display blanking circuit 53 as long as the input voltage is below 0.1 volt, which corresponds to a torque measurement of 20 lb.-feet.

A gauge signal provided to the input terminal 59 is applied through resistor 60 to the noninverting input of voltage follower amplifier 61 which provides the torque signal, through diode 63 at the noninverting input of voltage follower amplifier 62. This signal charges capacitor 64, generating the peak value signal which is provided at the output of amplifier 62. Capacitor 64 charges as long as the gauge signal is increasing.

The output of amplifier 62 is selected through display select switch 54 and connected through resistor 75 to the display input of display driver circuit 51 and through resistor 112 to comparator circuit 111 which controls blanking of the display unit until the gauge signal exceeds 0.1 volts. Display driver circuit 51 responds to the peak value signal to generate control signals for application to the display unit through output lines 103 to display the current value of the peak signal.

The comparator amplifier 81 compares the peak value signal with the gauge signal coupled through resistor 88. As long as the gauge signal is equal to or greater than the peak voltage on capacitor 64, the output of the amplifier 81 remains high such that transistor 82 is conducting, presenting a reference level to the control input of display driver circuit 51, which enables the display driver circuit to follow the gauge signal supplied to its display input. The gauge signal conducted through resistor 88 also charges capacitor 87.

When the gauge signal begins to decrease, diode 63 becomes reversed biased because the peak signal exceeds the gauge signal. Capacitor 64 begins to discharge slowly through resistors 65 and 66 immediately after the guage signal decreases. The rate or discharge is, however, extremely long in relation to the update period, and may, for example, be 2 minutes.

When the gauge signal begins to decrease, capacitor 87 by its charge initially holds the noninverting input of amplifier 81 at a level corresponding to that of the peak hold signal provided at the inverting input of amplifier 81 by capacitor 64 through amplifier 62. However, capacitor 87 begins to discharge through resistor 88, following the decreasing gauge signal. After a time, set to be about ⅓ second, the update time of the display driver circuit 51, the decrease in potential at the noninverting input of amplifier 81 relative to the potential at its inverting input causes the amplifier 81 to switch state, rendering transistor 82 non-conducting, providing a positive voltage level at the display input. This inhibits the display driver circuit 51, causing it to maintain the last value displayed, which corresponds to the peak value of the gauge signal detected by the peak hold circuit 45. The inhibit circuit 46 and the hold feature of the analog-to-digital converter of the display driver circuit 51 permit maintaining of the peak value for a time while capacitor 64 subsequently discharges following decrease in the gauge signal. The delay circuit 47, comprised of resistor 88 and capacitor 87, delays the response of the inhibit circuit 46 to the decrease in the input gauge signal to insure that the peak reading is captured and maintained by the display driver circuit 51.

The display will maintain peak reading for a period determined by the discharge time of capacitor 64. This period is relative to the actual charge voltage placed on capacitor 64. That is, the higher the voltage, the longer the period, which may be 2 minutes for the midrange hold period.

In applications where it is desirable to track the input gauge signal, switch 68 is operated closed to connect resistor 69 in parallel with capacitor 64 providing a fast discharge path for the capacitor. In such mode, peak detecting circuit 32 follows increases or decreases of the gauge signal, allowing the display unit to display current value of the gauge signal.

The gauge signal is also fed through resistor 92 to the noninverting input of amplifier 91 of the preset indicating circuit 33. If the gauge signal exceeds the preset level established at the inverting input of amplifier 91 by potentiometer 95, the amplifier 91 switches state and, indicator 50 is actuated.

In the foregoing illustration, the scaling select circuit is set to cause the display driver circuit to display the value of the torque signal in units of lb.-foot. In this mode a 1 volt input results in a displayed reading of 200 lb.-foot. When switch 106 is operated closed, resistors 104 and 105 are connected between the display input of the display driver circuit 51 and signal to the display driver circuit 51 such that a volt input results in a display of 271 N.m.

Although the above description refers to an analog circuit to develop the necessary delay, it is to be understood that such delay could be furnished either by a suitably programmed microprocessor or by a digital one-shot multivibrator.

We claim:

1. A torque wrench comprising a torque lever, a torque stud, strain responsive means, signal processing means and digital display means, said torque lever including an elongated rigid arm member having a longitudinal axis, said torque stud having a drive axis extending perpendicular to the longitudinal axis of said arm member near one end thereof, said torque stud including a generally cylindrical base portion having a first end fixed to said arm member near said one end and a second end formed with a drive portion which is adapted to engage a workpiece, said torque stud projecting from said arm member in cantilever fashion supported on said arm member only by its first end, and said strain responsive means being mounted on said cylindrical base portion of said torque stud between its first and second ends for producing a torque signal related to torque transmitted to the workpiece by said torque stud as said arm member is rotated about the drive axis of said torque stud, said signal processing means responding to torque signals provided by said strain responsive means to cause said digital display means to display a numerical representation of the amount of torque transmitted by said torque stud.

2. The torque wrench according to claim 1, wherein said torque stud is formed integrally with said arm member.

3. The torque wrench according to claim 1, wherein said base portion of said torque stud has a circular cross section, and said strain responsive means includes first and second pairs of resistive strain gauge elements mounted on opposite sides of said base portion of said torque stud.

4. The torque wrench according to claim 1, wherein said signal processing means includes means for blanking said display means whenever the torque signal is less than a preset value.

5. The torque wrench according to claim 1, wherein said signal processing includes scaling circuit means for controlling said display means to display the representation of torque in preselected engineering units.

6. In a torque measuring apparatus including sensor means for producing a time varying torque signal related to the instantaneous value of torque measured, and digital display means, signal processing means responsive to said torque signal for causing the digital display means to display a numerical representation of torque measured, said signal processing means comprising input means, signal following means, display control means including display driving means having a display input and a control input, said input means being coupled to said sensor means for receiving the torque signal, said signal following means being interposed between said input means and said display driving means for applying the torque signal to said display input of said display driving means, said display driving means responding to the torque signal to cause the display means to display a numerical representation of the instantaneous value of the torque measured, and said signal following means including inhibit means responsive to a decrease in the torque signal from a peak value for generating a control signal for application to said control input of said display driving means at a preselected time following the occurrence of the decrease in the torque signal to inhibit said display driving means from further responding to the torque signal after the occurrence of the decrease in the torque signal thereby causing the digital display means to display the peak value of torque measured.

7. The torque measuring apparatus according to claim 6, wherein said signal following means includes peak hold means responsive to the time varying torque signal for generating a peak value signal corresponding to the instantaneous value of the torque signal as long as the torque signal is increasing in amplitude and for maintaining the peak value of the torque signal following a decrease in the torque signal from a peak value.

8. The torque measuring apparatus according to claim 7, wherein said signal following means comprises means for preventing said inhibit means from providing its control output to permit said display driving means to respond to increases and decreases in the torque signal and cause the digital display means to continuously display instantaneous values of torque measured.

9. The torque measuring apparatus according to claim 7, wherein said inhibit means comprises comparator means for comparing the torque signal with the peak value signal and for providing said control output whenever the peak value signal exceeds the torque signal indicative of a decrease in the torque signal from a peak value, and delay means for delaying the response of said comparator means to a decrease in the torque signal relative to the peak value signal for said preselected time.

10. The torque measuring apparatus according to claim 7, wherein said delay means comprises resistance means and capacitance means, said resistance means coupling the torque signal to said comparator means, said capacitor means being charged by the torque signal while the torque signal is increasing and said capacitance means discharging following a decrease in the torque signal to delay response of the comparator means to the decrease in the torque signal for a time defined by the discharge time of said capacitance means.

11. The torque measuring apparatus according to claim 6, wherein said display control means further comprises display blanking circuit means including comparator means and switching means, said comparator means comparing the torque signal with a reference signal and providing a display inhibit signal for a predetermined difference between the torque signal and the reference signal, said switching means responding to said display inhibit signal to deenergize the digital display means.

12. The torque measuring apparatus according to claim 6, wherein said display control means further comprises scaling circuit means including current sink means and switching means, said switching means being operable in a first mode to connect said current sink means to said display input of said display driving means to cause the digital display means to display torque measured in first engineering units, and said switching means being operable in a second mode to disconnect said current sink from said display input of said display driving means to cause the digital display means to display torque measured in second engineering units.

13. The torque measuring apparatus according to claim 12, wherein said current sink comprises at least first and second resistance means connected in a series circuit path between the signal output of said signal following means and a point of reference potential, the junction of said first and second resistance means being connected to said display input of said display driving means and said switching means being operable in said second mode to interrupt said series circuit path to thereby adjust the value of the torque signal applied to said display input.

14. A torque wrench comprising a torque lever, a torque stud, strain responsive means, signal processing means, and digital display means, said torque lever including an elongated rigid arm member having a longitudinal axis, said torque stud having a drive axis extending perpendicular to the longitudinal axis of said arm member near one end thereof and having a first end fixed to said arm member near said one end and a second end adapted to engage a workpiece, said strain responsive means being mounted on said torque stud between its first and second ends for producing a time varying torque signal related to torque transmitted to the workpiece by said torque stud as said arm member is rotated about the drive axis of said torque stud, said signal processing means and said digital display means being supported on said arm member, said signal processing means including peak hold means and inhibit means, said peak hold means responsive to said time varying torque signal for generating a peak value signal corresponding to the instantaneous value of the torque signal as long as the torque signal is increasing in amplitude and for maintaining the peak value of the torque signal following a decrease in the torque signal from a peak value, said peak value signal being applied to said digital display means which responsively displays a numerical representation of torque measured, and said inhibit means being responsive to a decrease in the torque signal from a peak value for generating a control signal for application to said digital display means at a preselected time following the occurrence of the decrease in the torque signal to cause said digital display means to display the peak value of torque measured.

15. The torque measuring apparatus according to claim 14, wherein said inhibit means comprises comparator means for comparing the torque signal with the peak value signal and for providing said control signal whenever the peak value signal exceeds the torque signal indicative of a decrease in the torque signal from a peak value, and delay means for delaying the response of said comparator means to a decrease in the torque signal relative to the peak value signal for said preselected time.

16. The torque measuring apparatus according to claim 15, wherein said delay means comprises resistance means and capacitance means, said resistance means coupling the torque signal to said comparator means, said capacitor means being charged by the torque signal while the torque signal is increasing and said capacitance means discharging following a decrease in the torque signal to delay response of the comparator means to the decrease in the torque signal for a time related to the discharge time of said capacitance means.

* * * * *